(12) United States Patent
Näppi et al.

(10) Patent No.: US 10,622,779 B1
(45) Date of Patent: Apr. 14, 2020

(54) FIBER LASER PUMP REFLECTOR

(71) Applicant: Corelase Oy, Tampere (FI)

(72) Inventors: Jari Näppi, Tampere (FI); Arto Salokatve, Tampere (FI)

(73) Assignee: Corelase Oy, Tampere (FI)

( * ) Notice: Subject to any disclaimer, the term of this patent is extended or adjusted under 35 U.S.C. 154(b) by 0 days.

(21) Appl. No.: 16/381,715

(22) Filed: Apr. 11, 2019

(51) Int. Cl.
*H01S 3/094* (2006.01)
*H01S 3/067* (2006.01)

(52) U.S. Cl.
CPC .... *H01S 3/094015* (2013.01); *H01S 3/06708* (2013.01); *H01S 3/06754* (2013.01); *H01S 3/094007* (2013.01)

(58) Field of Classification Search
CPC ............. H01S 3/06708; H01S 3/06754; H01S 3/094007; H01S 3/094015
USPC ............................. 372/6; 385/43; 359/341.1
See application file for complete search history.

(56) References Cited

U.S. PATENT DOCUMENTS

| | | | |
|---|---|---|---|
| 6,324,326 B1* | 11/2001 | Dejneka | G02B 6/1228 359/341.1 |
| 6,397,636 B1* | 6/2002 | DiGiovanni | G02B 6/2835 65/395 |
| 6,434,302 B1* | 8/2002 | Fidric | G02B 6/2856 385/43 |
| 6,477,295 B1 | 11/2002 | Lang et al. | |
| 6,700,697 B2 | 3/2004 | Nikolajsen et al. | |
| 7,286,283 B2 | 10/2007 | Starodoumov | |
| 8,620,121 B2* | 12/2013 | Muendel | G02B 6/262 385/34 |
| 2003/0128723 A1* | 7/2003 | Bayart | G02B 6/2856 372/6 |
| 2009/0232453 A1 | 9/2009 | Muendel | |
| 2013/0243377 A1* | 9/2013 | Seo | G02B 6/2821 385/37 |

FOREIGN PATENT DOCUMENTS

| WO | 2009/077637 A1 | 6/2009 |
|---|---|---|
| WO | 2016/062914 A1 | 4/2016 |

OTHER PUBLICATIONS

Royon et al., "High Power, Continuous-Wave Ytterbium-Doped Fiber Laser Tunable from 976 to 1120 nm", Optics Express, vol. 21, No. 11, Jun. 3, 2013, pp. 13818-13823.
Wheeler et al., "Multipass Hollow Core-PCF Microcell Using a Tapered Micromirror", Journal of Lightwave Technology, vol. 29, No. 9, May 1, 2011, pp. 1314-1318.

\* cited by examiner

Primary Examiner — Tuan N Nguyen
(74) Attorney, Agent, or Firm — Morrison & Foerster LLP

(57) ABSTRACT

A pump reflector for efficiently recycling unabsorbed pump radiation in a diode-pumped fiber laser includes a core for guiding a laser beam, a pump cladding, and a tapered capillary tube. Pump radiation is adiabatically guided in the tapered capillary tube, which includes a mirror that is reflective for the pump radiation. The pump reflector may be packaged as a fiber component for co-propagating or counter-propagating fiber laser amplifiers and resonators.

21 Claims, 6 Drawing Sheets

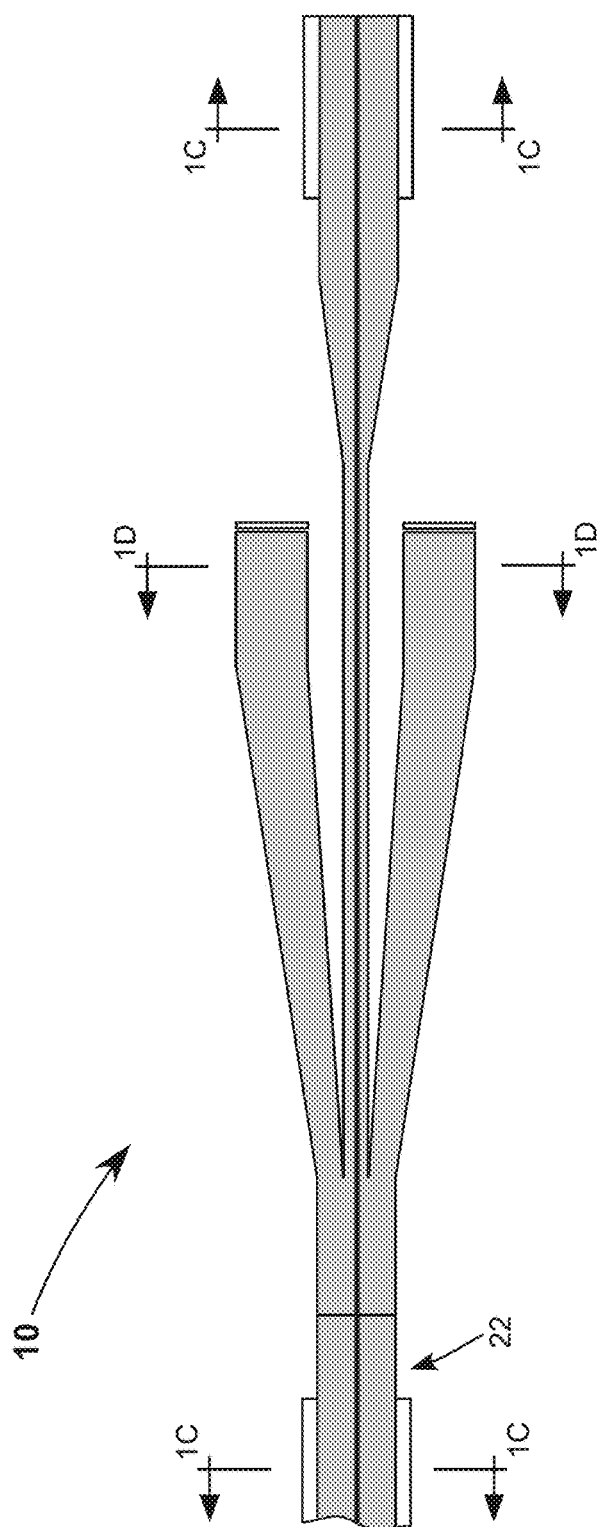
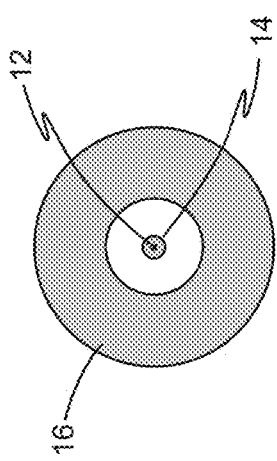
FIG. 1B
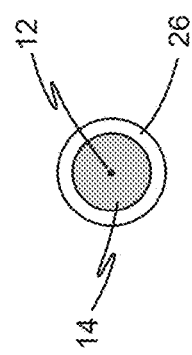
FIG. 1C
FIG. 1D

FIBER LASER PUMP REFLECTOR

TECHNICAL FIELD OF THE INVENTION

The present invention relates in general to fiber-laser resonators and amplifiers. The invention relates in particular to high-power fiber-laser resonators and amplifiers having cladding-pumped gain fibers.

DISCUSSION OF BACKGROUND ART

Beams of laser-radiation are increasingly used for cutting, drilling, marking, and scribing workpieces made of a wide range of materials; including metals, glasses, and polymers. Traditional mechanical processing produces unwanted defects, such as micro-cracks that may propagate when a processed workpiece is stressed, thereby degrading and weakening the processed workpiece. Laser-processing minimizes such unwanted defects, is generally cleaner, and causes a smaller heat-affected zone. Laser-machining uses a focused laser-beam to produce precise cuts and holes, having high-quality edges and walls, while minimizing the formation of unwanted defects. In laser welding, a focused laser-beam locates each weld spot or seam precisely and produces minimal collateral heating.

Fiber lasers are used extensively in industrial laser-processing applications that require both high power and high beam quality. For example, laser cutting and laser welding of metals and metal alloys. In a fiber laser, the gain medium is an optical fiber having a core that is doped with an optically-active ion, such as neodymium ($Nd^{3+}$), ytterbium ($Yb^{3+}$), thulium ($Tm^{3+}$), or erbium ($Er^{3+}$). A laser beam at an emission wavelength of the optically active ion is both amplified and guided within the core. The core is typically energized with pump radiation provided by a plurality of diode lasers. Diode lasers efficiently convert electrical power into optical power that can be directed into a gain fiber. In a "cladding-pumped" arrangement, the pump radiation is guided along the gain fiber in a pump cladding that jackets the core. An outer cladding jackets the pump cladding.

Most of the pump radiation is absorbed by the core over a sufficient length of gain fiber, which is desirable for optimal overall efficiency. Too much unabsorbed pump radiation can cause undesirable heating and even damage optical components located in the path of an output laser beam. By way of example, for a cladding-pumped gain fiber that absorbs 1 decibel (dB) of pump radiation per meter (m) length of fiber, 20 m of gain fiber is required to absorb 20 dB of pump radiation.

For high-power operation, especially in gain fibers having a small diameter core for single-mode operation, undesirable non-linear processes become enhanced through confinement of the amplified laser beam within the core. For pulsed laser operation with high peak-powers, non-linear processes such as four-wave mixing and self-phase modulation spectrally broaden the beam and reduce overall efficiency. For laser beams having narrow spectral bandwidths and long temporal coherence, stimulated Brillouin scattering causes back reflections that reduce efficiency and ultimately limit the output power of the fiber laser. Such back reflections can permanently damage the fiber laser and render it inoperative. Non-linear processes can be mitigated by reducing the length of the gain fiber. However, the concentration of the optically-active ion in the core must be increased to compensate and maintain overall efficiency, which increases the heat load on the gain fiber. For high-power operation, high heat loads can cause transverse mode instabilities that substantially degrade beam quality and mode stability.

For many optically active ions, particularly thulium, self-absorption causes the wavelength of maximum net gain to shift to longer wavelengths as the length of a gain fiber is increased. In a fiber laser resonator, resonator mirrors having relatively narrow spectral bandwidths are located at each end of the fiber laser resonator and are selected to force operation at a desired wavelength within the gain spectrum of the gain fiber. However, self-absorption causes a mismatch between the desired wavelength and the wavelength of maximum net gain in the gain fiber. This mismatch becomes a loss that ultimately clamps the power a laser beam can extract from the energized gain fiber. It also makes the operating wavelength of a fiber laser resonator sensitive to external back-reflections. Again, the wavelength mismatch and sensitivity to back-reflections could be mitigated by reducing the length of the gain fiber.

One way to maintain efficiency in a shorter gain fiber, without increasing the concentration of optically active ions in the core, is to recycle any unabsorbed pump radiation back into the pump cladding. This pump recycling works best in gain fibers that are pumped from just one end because the highest thermal loading is at the pumped end of the gain fiber. Unabsorbed pump radiation is recycled at the unpumped end of the gain fiber. Various recycling schemes have been proposed and tried. For example, Lang U.S. Pat. No. 6,477,295 has a groove around the circumference of the gain fiber. The groove has a surface inclined at 45° and must extend through most of the thickness of the pump cladding to efficiently recycle pump radiation, which mechanically weakens the gain fiber. Lang also proposes a high-reflection coating applied to most of an end facet of the fiber, with another etched fiber fusion spliced to the center of the end facet to guide the laser beam through the end facet. Again, this structure is mechanically weak. Depositing a uniform coating on such an assembly is difficult due to shadowing. Further, the coating having a relatively small area is vulnerable to optical damage when exposed to the unabsorbed pump radiation. Nikolajsen U.S. Pat. No. 6,700,697 proposes a high-reflection coating for both the pump beam and laser beam that completely coats a flat or hemispherical end facet. This coated end facet is similarly vulnerable to optical damage and is only useful in more complex multi-pass amplifier arrangements.

Starodoumov U.S. Pat. No. 7,286,283 describes a fiber amplifier having pump couplers at each end of the gain fiber. Each pump coupler includes multiple pump fibers that are bundled together and taper towards the gain fiber. Pump fibers that are not otherwise used may include mirrors to reflect unabsorbed pump radiation back to the gain fiber. Alternatively, unabsorbed pump radiation may be routed from an unused pump fiber in one coupler to an unused pump fiber in the other coupler. It should be noted that such rerouting would increase the thermal load at the hotter pumped end. Although these arrangements improve efficiency, only a fraction of any unabsorbed pump radiation is recycled, which limits the improvement in efficiency. Further, pump couplers having multiple bundled pump fibers are complex and difficult to fabricate.

There is need for a fiber laser architecture with a short gain fiber that efficiently recycles unabsorbed pump radiation and can be scaled to high powers. The architecture should be mechanically robust and resistant to optical damage. Preferably, the pump recycling would use relatively simple laser components, which are inexpensive and easy to fabricate.

SUMMARY OF THE INVENTION

In one aspect, a pump reflector for reflecting pump radiation in accordance with the present invention comprises a core extending between a first end and a second end of the pump reflector. The core has a refractive index. A pump cladding is provided having a refractive index lower than the refractive index of the core. The pump cladding is concentric with and envelopes the core. The pump cladding extends from the first end to the second end. A capillary tube is provided made of the same material as the pump cladding. The capillary tube is concentric with and surrounds the pump cladding. The capillary tube has a large end and a small end. The capillary tube is tapered from a larger outside diameter at the large end to a smaller outside diameter at the small end. The capillary tube is adiabatically tapered for the pump radiation. The small end of the capillary tube is fused to the pump cladding at the first end. The large end is reflective for the pump radiation.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

FIG. 1B is a cross-sectional view of the pump reflector and the optical fiber of FIG. 1A, with shading indicating material guiding the pump radiation.

FIGS. 1C and 1D are different cross-sectional views of the pump reflector and the optical fiber of FIG. 1A, shaded in the manner of FIG. 1B.

DETAILED DESCRIPTION OF THE INVENTION

Figure 1A:
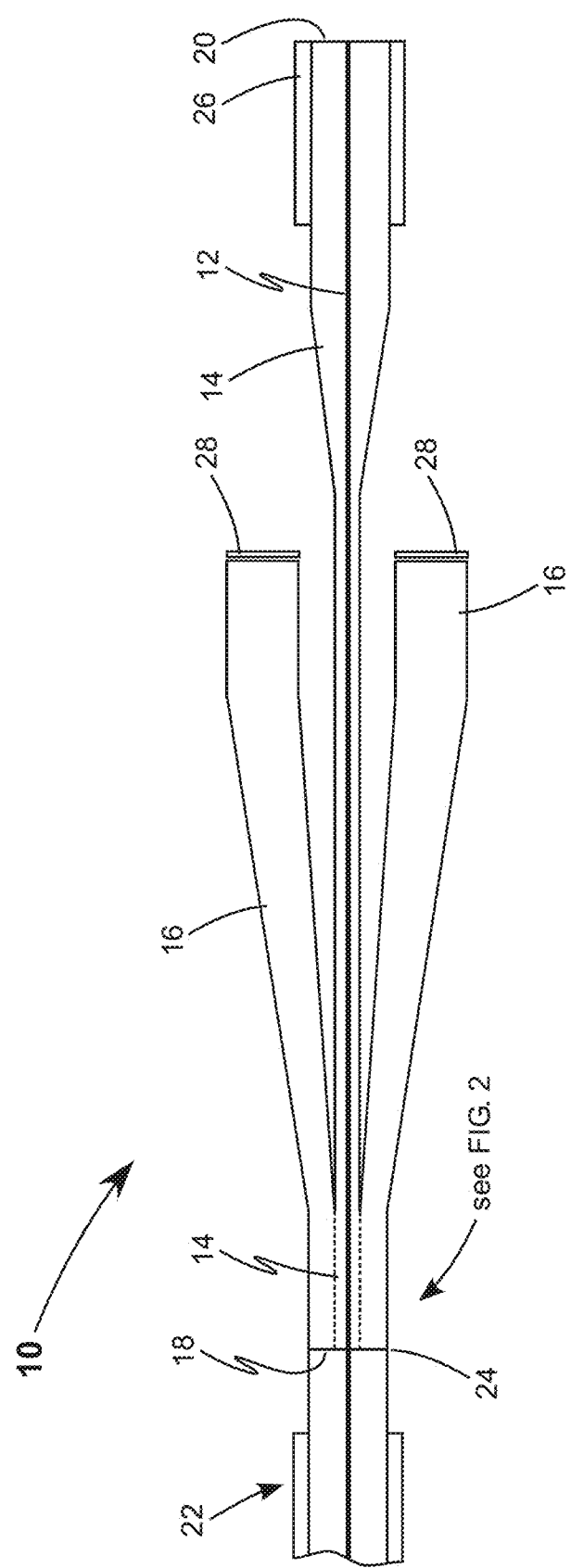
FIG. 1A is a cross-sectional view schematically illustrating one preferred embodiment of a pump reflector in accordance with the present invention, including a core, a pump cladding, a capillary tube, and a mirror, for reflecting unabsorbed pump radiation from an optical fiber back into the optical fiber, while a laser beam from the optical fiber propagates through the core.

Referring now to the drawings, wherein like components are designated by like numerals, FIG. 1A is a cross-sectional view schematically illustrating one preferred embodiment 10 of a pump reflector in accordance with the present invention. Pump reflector 10 comprises a core 12, a pump cladding 14 that envelopes core 12, and a capillary tube 16 that surrounds pump cladding 14. Pump cladding 14 and capillary tube 16 are concentrically arranged around core 12. Core 12, pump cladding 14, and capillary tube 16 are all preferably made of glasses to enable high-power operation. For example, the core, the pump cladding, and the capillary tube are made of silica or fluoride glasses. Pump cladding 14 and capillary tube 16 are preferably made of the same glass. Core 12 has a higher refractive index than pump cladding 14 and capillary tube 16. Core 12 and pump cladding 14 extend along the whole length of the pump reflector, from a first end 18 to a second end 20.

Capillary tube 16 has large segment at a large end, a small segment at an opposite small end, and a tapered segment therebetween. This taper is formed by heating and stretching a uniform capillary tube, which approximately maintains the aspect ratio of outside diameter to inside diameter along the whole length of the tapered capillary tube. The small segment of capillary tube 16 is fused to pump cladding 14 at first end 18. A fused interface is indicated by a broken line on the drawing. However, melting while fusing erases any discontinuity such that the pump cladding and capillary tube become essentially one piece of glass.

Pump reflector 10 is depicted spliced to an optical fiber 22, which by way of example, could be a gain fiber in a fiber laser. The pump reflector and the optical fiber are joined by a splice 24 at first end 18. Here, optical fiber 22 has a core that is the same diameter as core 12 and a pump cladding that is the same outside diameter as pump reflector 10 at first end 18, which is preferred for high-power operation. Any differences in these dimensions would cause power losses and unwanted heating around splice 24. Therefore, capillary tube 16 is tapered to match the outside diameter of the small segment to the outside diameter of the pump cladding of optical fiber 22. Similarly, any lateral misalignment between the cores and pump claddings of the pump reflector and the optical fiber would cause power loss and unwanted heating.

Here, pump cladding 14 is the pump cladding of another optical fiber that has been etched at first end 18 to have a uniform outside diameter that is slightly smaller than the inside diameter of the small segment of capillary tube 16 prior to fusing. The opposite end of this other fiber becomes the second end of pump reflector 10. The transition between the etched and unetched portions of this fiber could be tapered as depicted or abrupt. An outer coating 26 having a lower refractive index than pump cladding 14 provides mechanical and chemical protection to the unetched portion. The unetched portion of the pump reflector that is sheathed in outer coating 26 has been foreshortened for purposes of illustration. However, this portion would have a length determined by practical considerations. For example, a short length sufficient to allow splicing to another optical component or a long length sufficient to deliver an output laser beam to an application. It should be noted, here, that the pump cladding of such a "double-clad fiber" is essentially a core for pump radiation and is sometime referred to as a "pump core" by practitioners of the art.

The large segment of capillary tube 16 includes a mirror 28 that is reflective to pump radiation. Here, mirror 28 is depicted as a reflective coating on an end-face of the large segment. By way of example, this coating could be a metal coating or a thin-film dielectric coating. Alternatively, a Bragg grating could be incorporated into the large segment. A thin-film dielectric coating is preferred for high-power operation because these coatings can be designed and deposited to have high optical-damage thresholds. An advantage of pump reflector 10 having capillary tube 16 is that mirror 28 has a large area compared to the cross sectional area of a pump cladding in a typical optical fiber, which reduces the intensity of incident unabsorbed pump radiation. A larger capillary tube 16 can be selected to further reduce this intensity. For example, the pump reflector could be tolerant of very high incident powers caused by the pump radiation being deliberately or accidentally tuned away from an absorbing wavelength of a gain fiber.

FIG. 1B is a cross-sectional view of pump reflector 10 and optical fiber 22, identical to FIG. 1A. Pump cladding 14, capillary tube 16, and the pump cladding of optical fiber 22 are all shaded in FIG. 1B. As discussed above, the shaded material preferably has the same composition and is essentially one piece of glass after the fusing to make pump reflector 10 and the splicing of pump reflector 10 to optical fiber 22. Guided pump radiation can therefore propagate through this shaded material with minimal losses. FIGS. 1C and 1D are different cross-sectional views in the planes indicated on FIG. 1B, with the same elements shaded. FIGS. 1C and 1D illustrate the concentric construction of the pump reflector. An annular space is defined between an outside diameter of the pump cladding and an inside diameter of the capillary tube at the large end of the capillary tube. Conveniently, air would fill this annular space, but it could be filled with another material having a lower refractive index than the pump cladding and the capillary tube.

Pump reflector 10 is depicted in FIGS. 1A-1D having the same dimensions at second end 20 as optical fiber 22. While in some applications this fiber commonality could be useful, in other applications it may be beneficial to have claddings that are larger or smaller in diameter at second end 20. The second end can be designed accordingly and pump cladding 14 fabricated from an optical fiber having the required dimensions.

Figure 2:
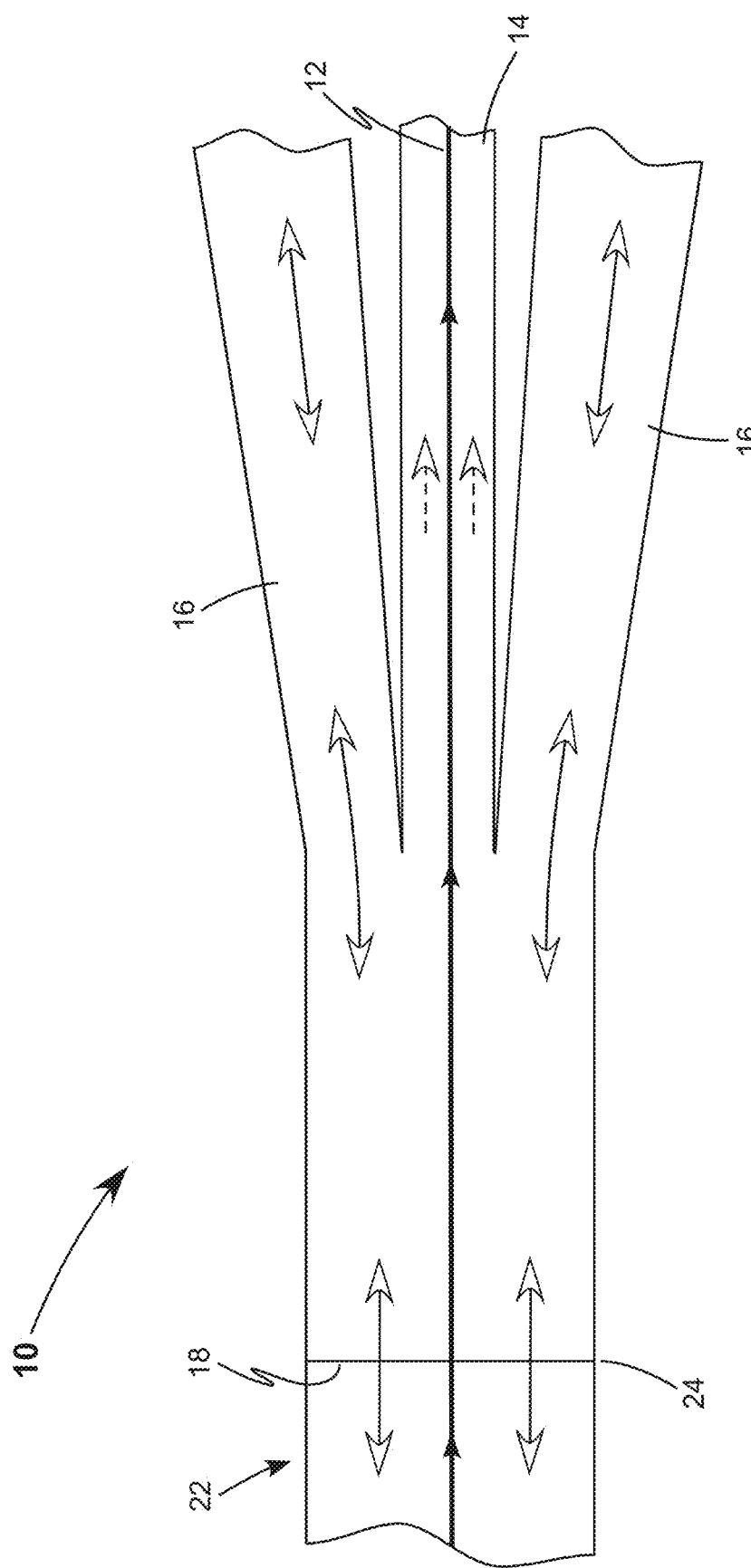
FIG. 2 is an enlarged cross-sectional view schematically illustrating further details of the pump reflector of FIG. 1A, with arrows indicating propagation of the pump radiation and the laser beam.

FIG. 2 is an enlarged cross-sectional view schematically illustrating further details near first end 18 of pump reflector 10 in FIG. 1A. The solid arrows indicate propagation of a laser beam through core 12. The open arrows indicate propagation of pump radiation. Unabsorbed pump radiation propagates out of optical fiber 22, through splice 24, and into pump reflector 10. Most of the unabsorbed pump radiation is guided into capillary tube 16, is reflected by mirror 28 (not depicted), and is then guided back through splice 24. This larger portion of the unabsorbed pump radiation is returned to optical fiber 22. A smaller portion of the unabsorbed pump radiation is guided into pump cladding 14 and cannot be returned to optical fiber 22. This smaller portion is depicted as a broken line and can be determined from dimensions of the pump reflector, as described below.

Figure 3:
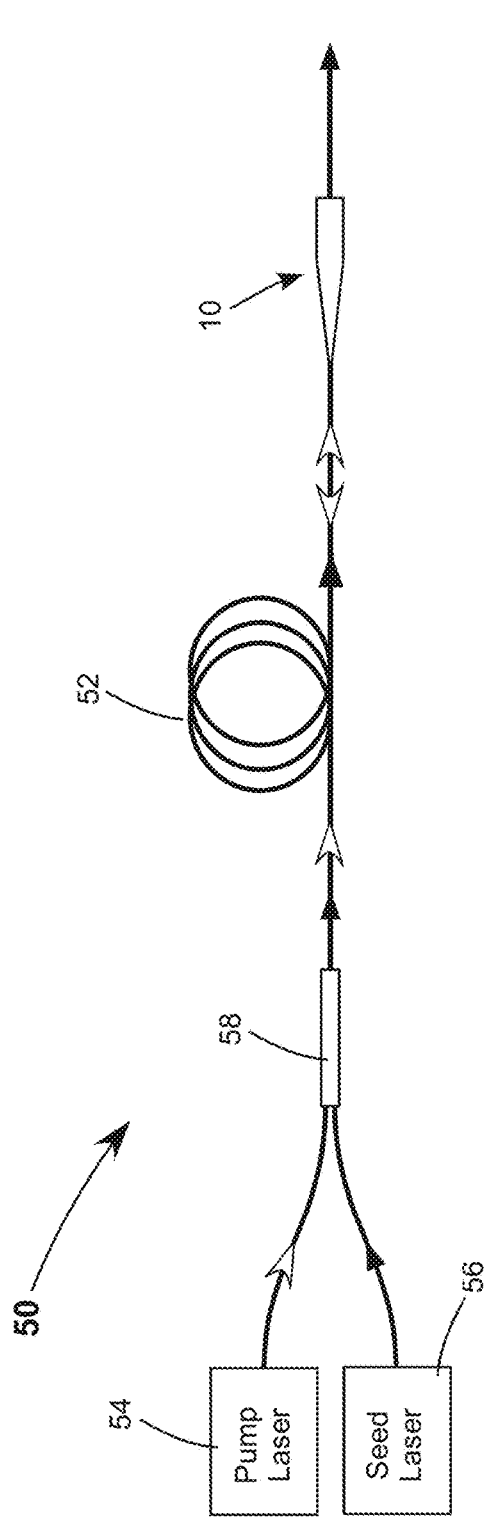
FIG. 3 schematically illustrates one preferred embodiment of a fiber laser amplifier in accordance with the present invention, including an optically-active gain fiber, a pump laser, a seed laser, a pump combiner, and the pump reflector of FIG. 1A, in a co-propagating arrangement.

FIG. 3 schematically illustrates one preferred embodiment 50 of a fiber laser amplifier in accordance with the present invention. Fiber laser amplifier 50 comprises an optically-active gain fiber 52, a pump laser 54 that provides pump radiation, a seed laser 56 that provides a laser beam to be amplified, a pump combiner 58 for guiding both the pump radiation and the laser beam into gain fiber 52, and pump reflector 10. These elements are connected as shown by optical fiber. Again, solid arrows indicate propagation of the laser beam and open arrows indicate propagation of the pump radiation. Fiber laser amplifier 50 is a co-propagating arrangement, having the pump radiation and the laser beam initially propagating in the same direction into gain fiber 52. The amplified laser beam, which emerges from pump reflector 10, may be further amplified or directed to an application. The pump reflector returns unabsorbed pump radiation, after a first pass through the gain fiber, back into the gain fiber for a second pass. Incorporating the pump reflector into the fiber laser amplifier improves its efficiency. It also enables the gain fiber to be shorter and therefore enables higher-power operation before being limited by non-linear processes, transverse mode instabilities, or self-absorption.

Figure 4:
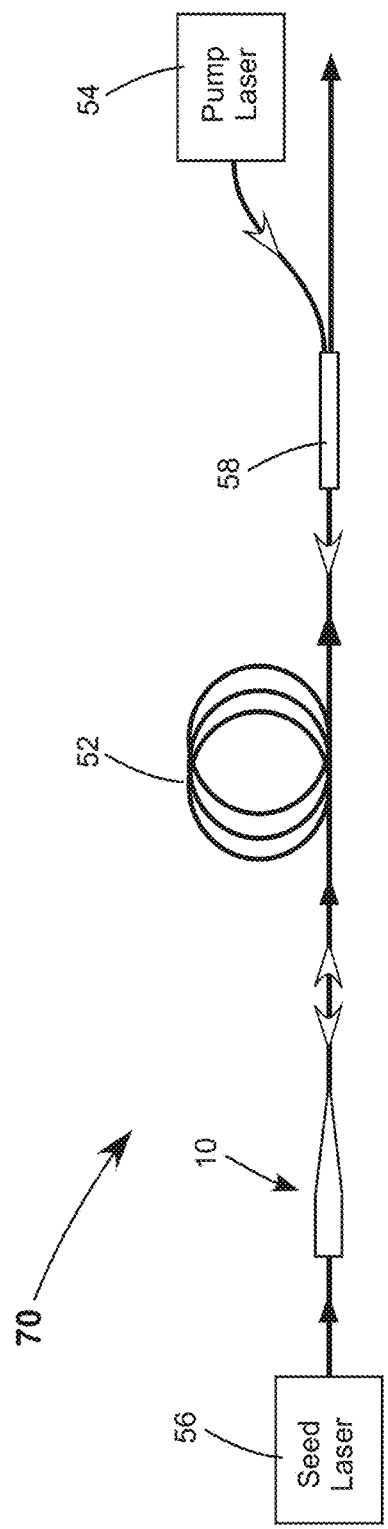
FIG. 4 schematically illustrates another preferred embodiment of a fiber laser amplifier in accordance with the present invention, similar to the fiber laser amplifier of FIG. 3, in a counter-propagating arrangement.

FIG. 4 schematically illustrates another preferred embodiment 70 of a fiber laser amplifier in accordance with the present invention. Fiber laser amplifier 70 has the same components as fiber laser amplifier 50, but in a counter-propagating arrangement. Pump radiation is directed into gain fiber 52 through pump combiner 58. The laser beam to be amplified is directed into gain fiber 52 through pump reflector 10. The pump radiation and the laser beam thereby initially propagating in opposite directions into the gain fiber. The amplified laser beam emerges from pump combiner 58. The pump reflector again returns unabsorbed pump radiation, after a first pass through the gain fiber, back into the gain fiber for a second pass. Incorporating the pump reflector into fiber laser amplifier 70 provides the same advantages as incorporating it into fiber laser amplifier 50.

Although embodiments 50 and 70 of FIGS. 3 and 4 are fiber laser amplifiers, the inventive pump reflector could be incorporated in a fiber laser resonator in the same manner. Equivalent laser resonators would omit seed laser 56, but would include a high-reflecting mirror and an output-coupling mirror at opposite ends of gain fiber 52. These mirrors define the fiber laser resonator. Typically, these resonator mirrors would be fiber Bragg gratings.

Figure 5:
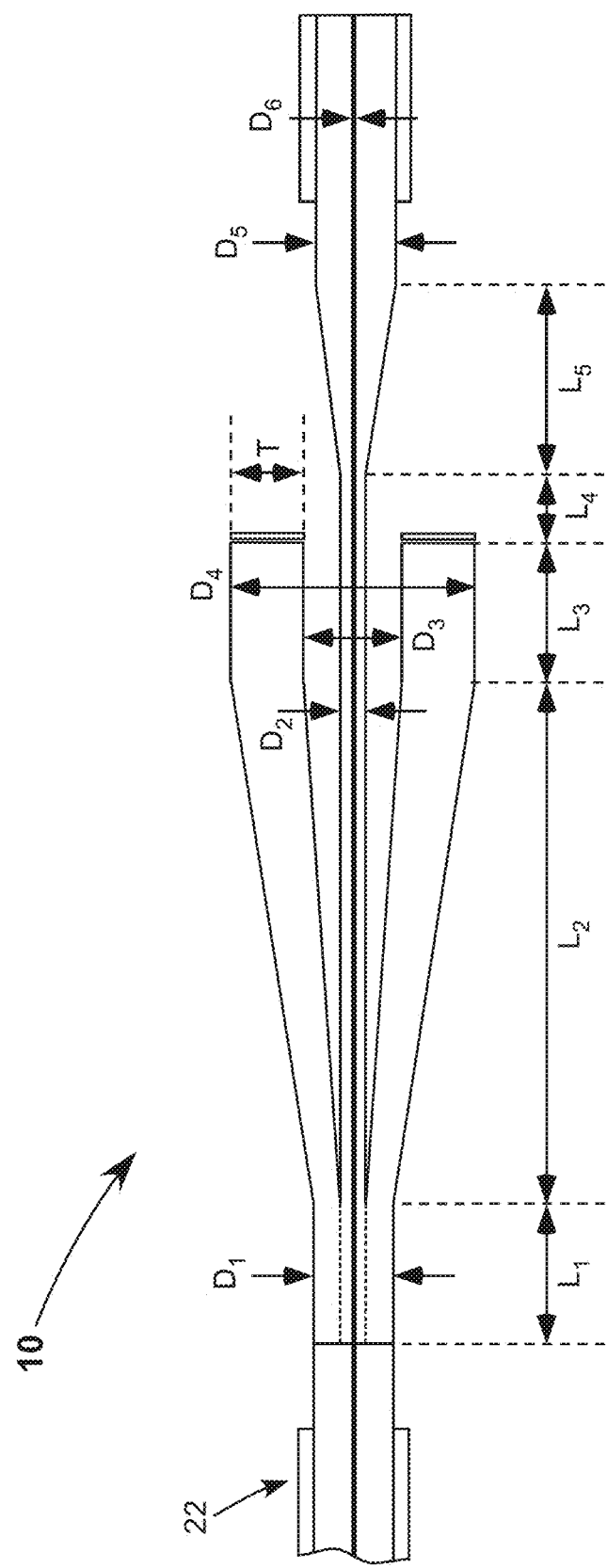
FIG. 5 is a cross-sectional view of the pump reflector and the optical fiber of FIG. 1A, which indicates dimensions of the pump reflector.

FIG. 5 is a cross-sectional view of pump reflector 10 and optical fiber 22, identical to FIG. 1A, which indicates dimensions of the pump reflector. $D_1$ is the diameter of the small segment of capillary tube 16, $D_2$ is the outside diameter of the etched portion of pump cladding 14, $D_3$ is the inside diameter of the large segment of capillary tube 16, $D_4$ is the outside diameter of the large segment of capillary tube 16, $D_5$ is the diameter of the unetched portion of pump cladding 14, and $D_6$ is the diameter of core 12. $L_1$ is the length of the small segment of capillary tube 16, $L_2$ is the length of the tapered segment of capillary tube 16, $L_3$ is the length of the large segment of capillary tube 16, $L_4$ is the distance between the capillary tube and the taper of pump cladding 14, $L_5$ is the length of the taper between the etched and unetched portions of pump cladding 14, and T is the thickness of the capillary tube wall.

An exemplary pump reflector for a fiber laser that has a ytterbium-doped gain fiber energized by pump radiation having a wavelength of about 976 nanometers (nm) and producing amplified laser radiation having a wavelength of about 1070 nm has the following dimensions: diameter $D_1$ is about 250 micrometers (μm), diameter $D_2$ is about 80 μm, diameter $D_3$ is about 250 μm, diameter $D_4$ is about 750 μm, diameter $D_5$ is about 250 μm, diameter $D_6$ is about 25 μm, length $L_2$ is about 20 millimeters (mm), and thickness T is about 250 μm. Other dimensions are less critical for the operation of the pump reflector, but some practical ranges are: length $L_1$ is from about 0.1 mm to about 50 mm, length $L_3$ is from about 0 mm to about 50 mm, and length $L_5$ is from about 0 mm to about 10 mm. It should be noted that, if necessary, pump cladding 14 could be fabricated without a taper between the etched and unetched portions.

The etched portion of pump cladding 14 is depicted protruding from capillary tube 16. A practical range for distance $L_4$ is from about 0 to about 50 mm. However, if diameter $D_3$ is sufficiently large, it is possible to recess the etched portion within the capillary tube. This is a design option for the exemplary pump reflector. By making diameter $D_5$ slightly smaller than diameter $D_3$ and by partially recessing the unetched portion of the pump cladding into the capillary tube, the capillary tube can provide mechanical support for the pump cladding.

One of skill in the art would recognize that length $L_2$ could be any length that provides for adiabatic propagation of pump radiation between the small and large ends of capillary tube 16. A practical range for length $L_2$ is from about 2 mm to about 50 mm. A practical range for diameter $D_1$ is from about 100 µm to about 600 µm. The lower bound of about 100 µm could be for splicing to a small single-mode optical fiber. The upper bound is around the maximum diameter for a flexible silica optical fiber. One of skill in the art would recognize that the pump reflector could be designed for use with a larger "rod fiber", without departing from the spirit and scope of the present invention. As discussed above, diameter $D_5$ can be selected according to the requirements of an application, but otherwise with the same considerations as for selecting $D_1$.

A practical lower bound for diameter $D_2$ is about 35 µm. Diameter $D_3$ must be larger than $D_2$. Diameter $D_4$ is determined by selection of diameter $D_2$ and thickness T. An advantage of pump reflector 10 is that thickness T can be increased as needed to reduce the intensity of unabsorbed pump radiation on mirror 28, to below an optical-damage threshold of a mirror coating. A practical range for thickness T is from about 100 µm to about 1000 µm. However, it is possible to fabricate the pump reflector with a capillary tube thicker than about 1000 µm using the method described below.

Core diameter $D_6$ is selected to match the core diameter of optical fiber 22. A typical range for an industrial fiber laser is from about 6 µm to about 40 µm. Pump reflector 10 could have a core 12 containing optical active ions or could be a passive component in a laser. For high-power applications, it may be preferable to have an updoped core 12, to reduce heat load on the pump reflector itself.

The overall reflectivity R of pump reflector 10 for unabsorbed pump radiation propagating out of optical fiber 22 can be calculated. As discussed above, a larger portion of the unabsorbed pump radiation is returned to optical fiber 22 after being reflected by mirror 28, which has a reflectivity of $R_M$ at the wavelength of the pump radiation. Using thin-film coating technology, it is not difficult to fabricate a mirror 28 having a reflectivity $R_M$ approaching 100%. A smaller portion that is guided into pump cladding 14 is lost and cannot be returned. These losses are the largest contributions to overall reflectivity R, which is therefore approximately:

$$R = \left(1 - \frac{D_2^2}{D_1^2}\right) R_M. \quad (1)$$

For the exemplary pump reflector described above, a reflectivity $R_M$ of about 95% would produce an overall reflectivity R of about 85%. It should be straight-forward to achieve an overall reflectivity of at least 80% for pump reflector 10, constructed as described above and fabricated as described below. A reflectivity in this range means that the inventive pump reflector effectively halves the length of gain fiber required to substantially absorb the pump radiation provided by a pump laser. For example, the length of gain fiber required to absorb 10 dB of the pump radiation.

The coating of mirror 28 could also be designed to have a low reflectivity at the wavelength of the laser beam. Any reflection of the laser beam is usually undesirable in a fiber laser. In a fiber laser resonator, such reflections cause unstable operation. In a fiber laser amplifier, a reflected beam can be amplified and cause permanent optical damage.

Figure 6:
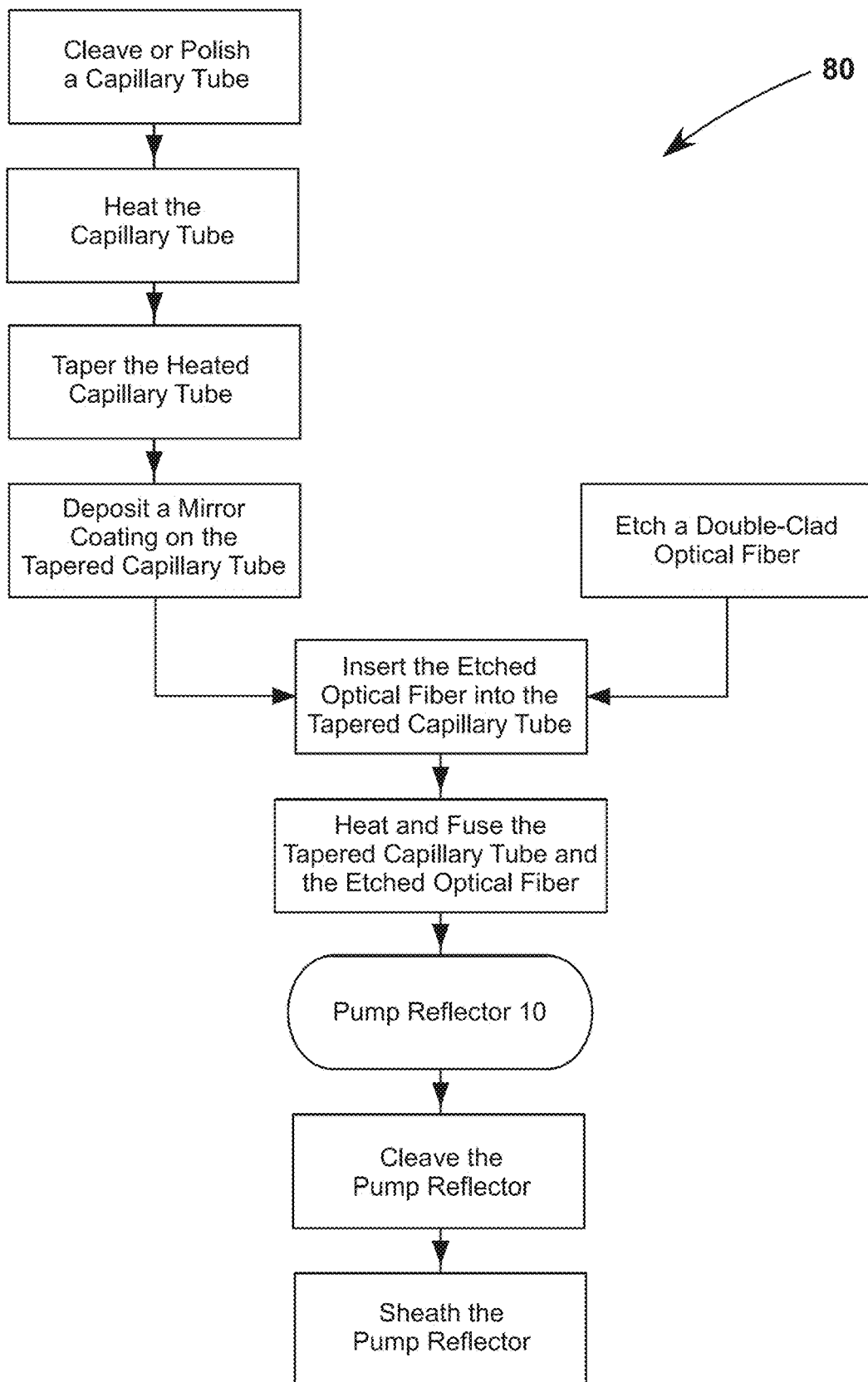
FIG. 6 is a flowchart schematically illustrating a method for making the pump reflector of FIG. 1A.

FIG. 6 schematically illustrates a preferred embodiment 80 of a method for making pump reflector 10 in accordance with the present invention. A capillary tube is selected and cleaved or polished to form an end-face that will later be coated. The capillary tube is heated above a softening point in a region between its ends and then tapered by pulling on the ends while simultaneously moving the heat source. The tapered capillary tube has an hourglass shape and a waist located in the region that was heated. There is (in order) a small segment, a tapered segment, and a large segment between the waist and the end-face. A mirror coating is deposited onto the end-face of the large segment. By way of example, a thin-film dielectric coating deposited, which is reflective at a pump wavelength and is transmitting at a laser wavelength. Coatings can be deposited onto a plurality of tapered capillary tubes in batch process.

A double-clad optical fiber is selected. One end thereof is stripped of outer cladding and then etched partially through the pump cladding. The pump cladding is partially-etched to a diameter that is just smaller than an inside diameter of the small segment of the tapered capillary tube. The partially-etched end is inserted through the small segment of the tapered capillary tube and held while at least a portion of the small segment is heated, collapsed, and fused onto the partially-etched pump cladding. The fused portion of the small segment and partially-etched end are cleaved to make an end that is ready for splicing. The finished pump reflector would be spliced onto an optical fiber in a fiber-laser resonator or amplifier.

Glass surfaces of the pump reflector could be sheathed in a protective coating, which could be the same material as the outer coating. The pump reflector could be fixedly attached to a baseplate or other supportive structure to make it mechanically robust. The pump reflector could be packaged as a fiber component. An unpackaged or packaged pump reflector could be attached or potted to a cooling plate to provide additional thermal resilience.

The present invention is described above in terms of a preferred embodiment and other embodiments. The invention is not limited, however, to the embodiments described and depicted herein. Rather, the invention is limited only by the claims appended hereto.

What is claimed is:

1. A pump reflector for reflecting pump radiation, comprising:
   a core extending between a first end and a second end of the pump reflector, the core having a refractive index;
   a pump cladding having a refractive index lower than the refractive index of the core; the pump cladding concentric with and enveloping the core, the pump cladding extending from the first end to the second end; and
   a capillary tube made of the same material as the pump cladding, the capillary tube concentric with and surrounding the pump cladding, the capillary tube having a large end and a small end, the capillary tube tapered from a larger outside diameter at the large end to a smaller outside diameter at the small end, the small end of the capillary tube fused to the pump cladding at the first end, the large end being reflective for the pump radiation.

2. The pump reflector of claim 1, wherein pump radiation propagating into the pump reflector at the first end and propagating into the capillary tube, is reflected at the large end of the capillary tube, thereby being directed to propagate back towards and out of the pump reflector at the first end.

3. The pump reflector of claim 2, wherein the pump radiation propagates into the pump reflector at the first end and propagates out of the pump reflector at the first end with an efficiency of at least 80%.

4. The pump reflector of claim 1, wherein a laser beam propagating into the core at the first end, propagates within the core from the first end to the second end.

5. The pump reflector of claim 1, wherein an end-face of the large end of the capillary tube includes a thin-film dielectric coating for reflecting the pump radiation.

6. The pump reflector of claim 1, wherein an end-face of the large end of the capillary tube includes a metal coating for reflecting the pump radiation.

7. The pump reflector of claim 1, wherein the large end of the capillary tube includes a Bragg grating for reflecting the pump radiation.

8. The pump reflector of claim 1, wherein a mirror in the large end is reflective at a pump wavelength and transmitting at a laser wavelength.

9. The pump reflector of claim 8, wherein the pump radiation at the pump wavelength is unabsorbed pump radiation from a fiber laser.

10. The pump reflector of claim 1, wherein the core, the pump cladding, and the capillary tube are made of glass, the pump cladding and the capillary tube being made of the same glass.

11. The pump reflector of claim 1, wherein the capillary tube is adiabatically tapered for the pump radiation.

12. The pump reflector of claim 1, wherein an annular space is defined between an outside diameter of the pump cladding and an inside diameter of the capillary tube at the large end of the capillary tube.

13. The pump reflector of claim 12, wherein the annular space is filled with air.

14. A method for making a pump reflector for reflecting pump radiation, comprising the steps of:
cleaving or polishing a capillary tube to form an end-face;
heating the capillary tube above its softening point in a region between ends thereof;
tapering the heated capillary tube by pulling on the ends thereof to form a small segment, a tapered segment, and a large segment thereof;
depositing a mirror coating on the end-face of the large segment;
etching one end of a double-clad optical fiber partially through a pump cladding thereof, the partially-etched end having a diameter that is just smaller than an inside diameter of the small segment of the tapered capillary tube;
inserting the partially-etched end of the optical fiber through the small segment of the tapered capillary tube; and
heating at least a portion of the small segment of the tapered capillary tube to collapse and fuse the portion of the small segment onto the partially-etched end of the optical fiber.

15. The method for making a pump reflector of claim 14, wherein the end-face of the large segment is polished flat.

16. The method for making a pump reflector of claim 14, wherein the mirror coating is a thin-film dielectric coating for reflecting the pump radiation.

17. The method for making a pump reflector of claim 14, wherein the mirror coating is a metal coating for reflecting the pump radiation.

18. The method for making a pump reflector of claim 14, wherein the mirror coating is reflective at a pump wavelength and transmitting at a laser wavelength.

19. The method for making a pump reflector of claim 14, wherein the pump cladding and the capillary tube are made of the same glass.

20. The method for making a pump reflector of claim 14, further comprising the step of cleaving the fused portion of the small segment and the partially-etched end to make an end of the pump reflector that is ready for splicing.

21. The method for making a pump reflector of claim 14, further comprising the step of sheathing glass surfaces of the pump reflector in a protective coating.

* * * * *